United States Patent [19]
Tanaka

[11] Patent Number: 6,115,590
[45] Date of Patent: Sep. 5, 2000

[54] RADIOTELEPHONE UNIT

[75] Inventor: Mitsuru Tanaka, Saitama, Japan

[73] Assignee: NEC Corporation, Tokyo, Japan

[21] Appl. No.: 09/085,024

[22] Filed: May 28, 1998

[30] Foreign Application Priority Data

May 28, 1997 [JP] Japan ................................ 9-153119

[51] Int. Cl.⁷ .................................................. H04B 1/06
[52] U.S. Cl. .......................... 455/266; 455/307; 455/340; 370/276; 370/280; 370/281
[58] Field of Search .................................. 455/552, 266, 455/307, 340; 370/252, 337, 276, 280, 281; 375/344

[56] References Cited

U.S. PATENT DOCUMENTS 5,548,836  8/1996  Taromaru .............................. 455/277.1
5,701,594  12/1997  Bath et al. ................................. 455/78
5,790,587  8/1998  Smith et al. ............................. 375/200
5,966,666  10/1999  Yamaguchi et al. ..................... 455/552

FOREIGN PATENT DOCUMENTS 7-202827  8/1995  Japan .

*Primary Examiner*—William G. Trost
*Assistant Examiner*—Temica M. Davis
*Attorney, Agent, or Firm*—Young & Thompson

[57] ABSTRACT

A radiotelephone unit for conducting time division mutiplex receiving includes a two intermediate-frequency filters provided with the same performance, and switches for switching alternately the two intermediate-frequency filters every time when a receive slot is changed. First and third receive slots are associated with one IF filter and second and fourth receive slots are associated with the other IF filter.

7 Claims, 4 Drawing Sheets

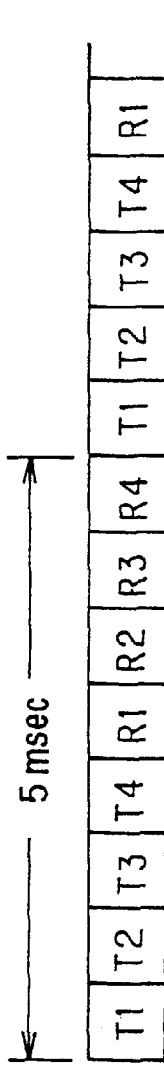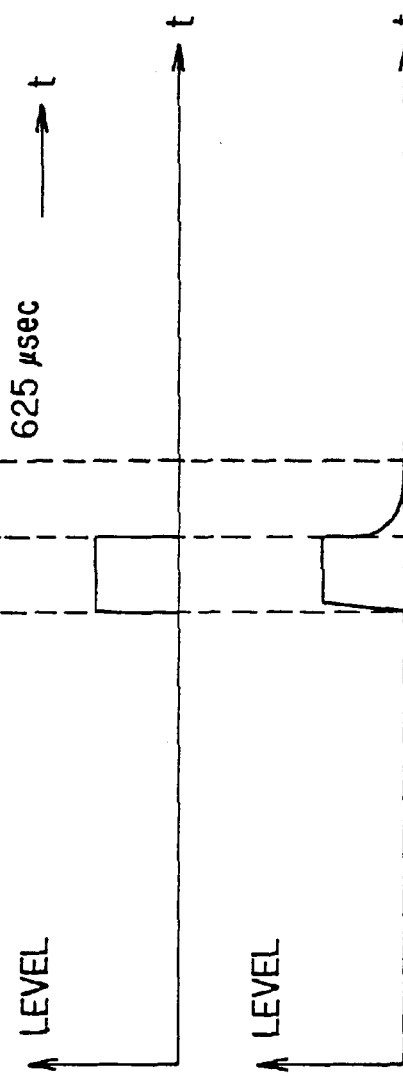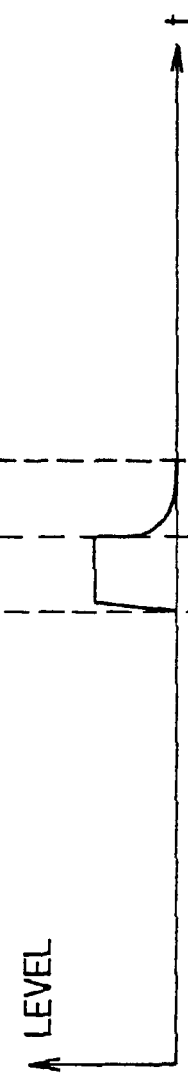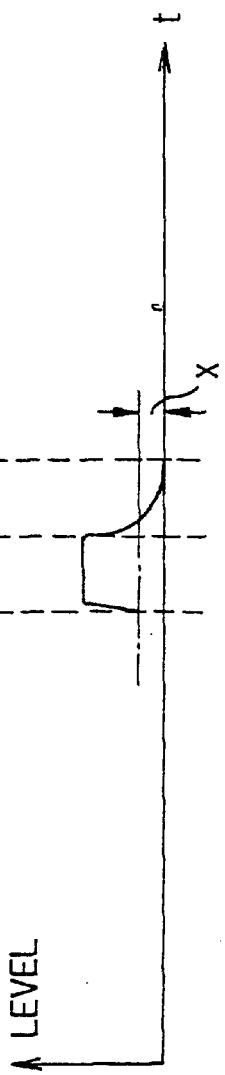

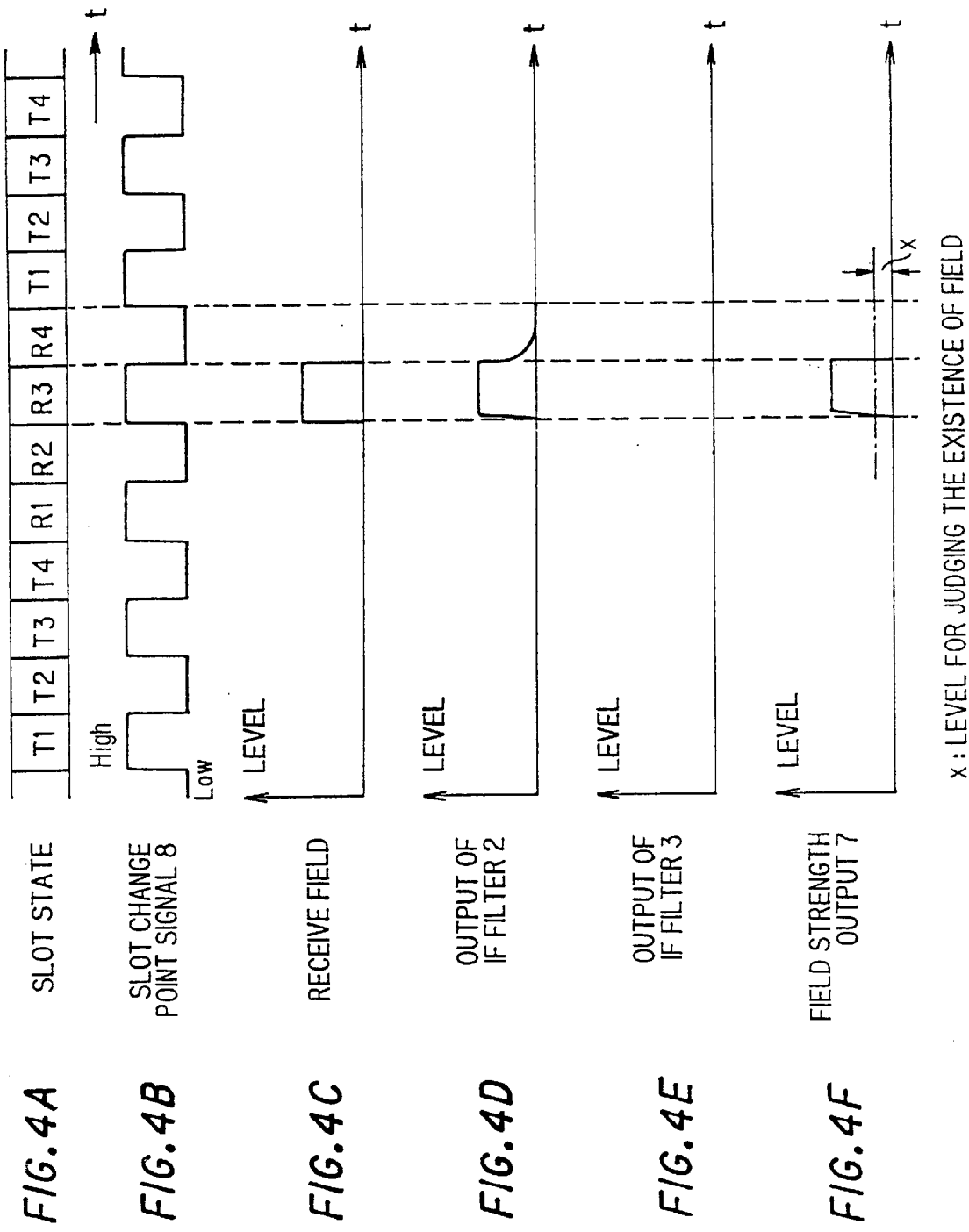

RADIOTELEPHONE UNIT

FIELD OF THE INVENTION

This invention relates to a radiotelephone unit, and more particularly to, a radiotelephone unit including a receiving circuit for TDMA (time division multiple access), such as PHS (personal handy-phone system).

BACKGROUND OF THE INVENTION

A conventional receiver circuit to conduct TDMA receiving (herein, also referred to as 'time division multiplex receiving') comprises a receive mixer circuit, an IR (intermediate-frequency) filter, an IF amplifier, a demodulator, and a controller to which a field strength output from the IF amplifier is input. This is a typical receiving circuit in which one IF filter is provided for one intermediate frequency.

For example, TDMA transmitting and receiving are conducted by using four transmit slots, T1, T2, T3 and T4 followed by four receive slots, R1, R2, R3 and R4. The four transmit slots and four receive slots compose one frame length. The TDMA transmitting and receiving are conducted by repeating such frames.

With regard to the four receive slots, in typical cases, one slot is assigned to a control channel and the other three slots are assigned to call channels. Thus, three calls at maximum can be simultaneously used.

Also, whether a receive slot is vacant and can be used as a call channel is judged as follows. In general, the field strength output from the IF amplifier is compared with a predetermined threshold value in the controller. When the former is higher than the latter, it is judged that an electric field exists and the receive slot is occupied. On the other hand, when the former is lower than the latter, it is judged that no electric field exists and the receive slot is vacant.

Thus, call channels can be in turn assigned to vacant slots, thereby allowing three calls at maximum to be used.

However, in the conventional TDMA receiver circuit, there is the problem that a receive slot to be duly judged as having no received field is erroneously judged as having a received field due to a delay in fall time of the field strength output for the previous receive slot. Therefore, the receive slot is not available for a call channel, thereby the three calls at maximum cannot be obtained and the connection rate must be reduced.

The problem is frequently caused by the performance of a SAW filter typically used as the IF filter.

Thus, it may happen that a receive slot duly available for a call channel cannot be used. This causes a reduction in the connection rate.

Especially when a received field to be input is high, the erroneous judgment as having a received field may frequently happen because the delay in field detection up to the next slot becomes significant with an increase in field strength level.

SUMMARY OF THE INVENTION

Accordingly, it is an object of the invention to provide a radiotelephone unit that all receive slots can be effectively used.

It is a further object of the invention to provide a method for conducting time division multiplex receiving that all receive slots can be effectively used.

According to the invention, a radiotelephone unit for conducting time division multiplex receiving, comprises:

two intermediate-frequency filters provided with a same performance; and means for switching alternately the two intermediate-frequency filters every time when a receive slot is changed.

According to another aspect of the invention, a method for conducting time division multiplex receiving, comprises the step of:

providing two intermediate-frequency filters with a same performance; and switching alternately the two intermediate-frequency filters every time when a receive slot is changed;

wherein a propagation response delay in the output of either of the two intermediate-frequency filters for a receive slot is cancelled by switching into the other of the two intermediate-frequency filters for the next receive slot.

BRIEF DESCRIPTION OF THE DRAWINGS

The invention will be explained in more detail in conjunction with the appended drawings, wherein:

FIGS. 2A to 2D are timing charts illustrating the operation of the circuit in FIG. 1, FIGS. 4A to 4F are timing charts illustrating the operation of the radiotelephone unit in FIG. 3.

DESCRIPTION OF THE PREFERRED EMBODIMENTS

Before explaining a radiotelephone unit in the preferred embodiment, the aforementioned conventional receiver circuit to conduct TDMA receiving will be explained in FIGS. 1 to 2D.

Figure 1:
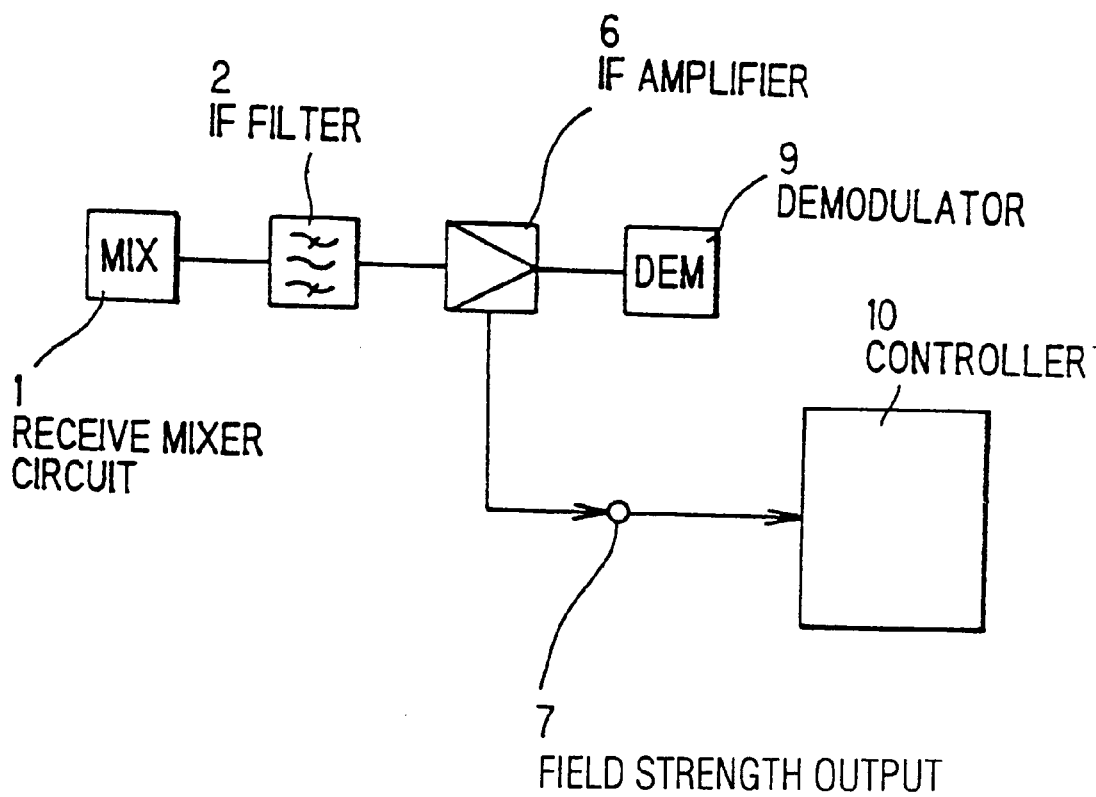
FIG. 1 is a block diagram showing a conventional TDMA receiver circuit.

FIG. 1 shows the conventional receiver circuit to conduct TDMA receiving. The receiver circuit comprises a receive mixer circuit 1, an IF (intermediate-frequency) filter 2, an IF amplifier 6, a demodulator 9, and a controller 10 to which a field strength output 7 from the IF amplifier 6 is input. This is a typical receiving circuit where one IF filter is provided for one intermediate frequency.

The TDMA receiving operation of the receiver circuit, which is taken as an example of a radiotelephone device for PHS base station, will be explained in FIGS. 2A to 2D.

FIG. 2A shows transmit and receive slots used for TDMA transmitting and receiving. One slot length is 625 $\mu$sec, and four transmit slots, T1, T2, T3 and T4 are followed by four receive slots, R1, R2, R3 and R4. The four transmit slots and four receive slots compose one frame length of 5 msec. The TDMA transmitting and receiving are conducted by repeating such frames.

With regard to the four receive slots, in typical cases, one slot is assigned to a control channel and the other three slots are assigned to call channels. Thus, three calls at maximum can be simultaneously used.

Also, whether a receive slot is vacant and can be used as a call channel is judged as follows. In general, the field strength output 7 from the IF amplifier 6 is compared with a predetermined threshold value in the controller 10. When the former is higher than the latter, it is judged that an electric field exists and the receive slot is occupied. On the other hand, when the former is lower than the latter, it is judged that no electric field exists and the receive slot is vacant.

Thus, call channels can be in turn assigned to vacant slots, thereby allowing three calls at maximum to be used.

However, in the conventional TDMA receiver circuit, there is the problem that a receive slot to be duly judged as having no received field is erroneously judged as having a received field due to a delay in fall time of the field strength output 7 for the previous receive slot.

For example, even when the third receive slot R3 receives an electric field and the fourth receive slot R4 receives no electric field (FIG. 2B), the output of the IF filter 2 may be not instantly returned to zero due to the propagation response delay that can have a fall time of tens of microseconds (FIG. 2C). If some field strength output 7 remains in the fourth receive slot R4 so that it can be judged as having a received field (FIG. 2D), the fourth receive slot R4 is not available.

Next, a radiotelephone unit in the preferred embodiment will be explained in FIG. 3, wherein like parts are indicated by like reference numerals as used in FIG. 1.

Figure 3:
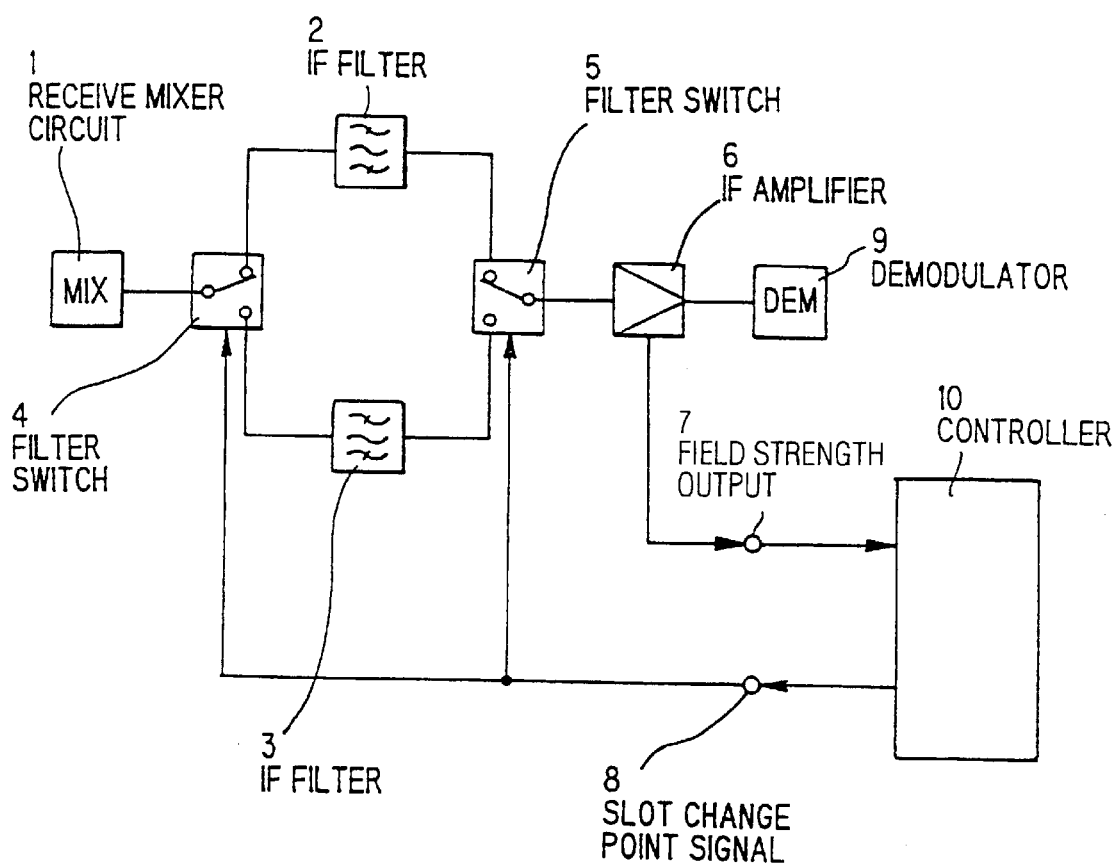
FIG. 3 is a block diagram showing a radiotelephone unit in a preferred embodiment according to the invention.

The radiotelephone unit in the embodiment, adding to the conventional unit composition in FIG. 3, comprises a receive mixer circuit 1, two IF (intermediate-frequency) filters 2, 3 inserted between the receive mixer circuit 1 and the IF amplifier 6, and filter switches 4, 5 to switch alternately the two IF filters 2, 3. The filter switches 4, 5 are controlled by a slot change point signal 8 from the controller 10.

The operation of the radiotelephone unit will be explained in FIGS. 4A to 4F. When the slot change point signal 8 from the controller 10 is at high level., the filter switches 4, 5 switch into the direction of the IF filter 2 for the first receive slot R1 and third receive slot R3.

The output of the IF filter 2 is input to the IF amplifier 6, then applied as a field strength output 7 to the controller 10, where it is used to judge the existence of electric field.

On the other hand, when the slot change point signal 8 from the controller 10 is at low level, the filter switches 4, 5 switch into the direction of the IF filter 3 for the second receive slot R2 and fourth receive slot R4.

The output of the IF filter 3 is input to the IF amplifier 6, then applied as a field strength output 7 to the controller 10, where it is used to judge the existence of electric field.

Now, taken is an example that only the third receive slot R3 is receiving (FIG. 4C). When the above-mentioned propagation response delay occurs at the IF filter 2 (FIG. 4D), an IF filter available is already switched into the IF filter 3 for the fourth receive slot R4 to follow R3. Thereby, the output of the IF filter 3 (FIG. 4E) is applied as a field strength output 7 (FIG. 4F) to the controller 10 to be used to judge the existence of electric field. Therefore, the propagation response delay occurring at the IF filter 2 does not affect the judgment of the existence of electric field in the controller 10.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth

What is claimed is:

1. A radiotelephone unit for conducting time division multiplex receiving, wherein a received frame includes plural consecutive receive slots, the radiotelephone unit comprising:

two intermediate-frequency filters provided with a same performance; and means for alternately switching into operation said two intermediate-frequency filters during receipt of a frame between each adjacent pair of the consecutive receive slots in the frame.

2. A radiotelephone unit, according to claim 1, further comprising:

a controller to which a field strength output from either of said two intermediate-frequency filters is input;

wherein said switching means switches alternately said two intermediate-frequency filters every time when one of the receive slots is changed according to a slot change point signal to be output from said controller.

3. The radiotelephone unit of claim 1, where there are four of the consecutive receive slots, and wherein a first one of said two filters is switched into operation during first and third of the four consecutive receive slots and a second one of said two filters is switched into operation during second and fourth of the four consecutive receive slots.

4. The radiotelephone unit of claim 1, further comprising a receive mixer circuit and an intermediate frequency amplifier, and wherein said switching means comprises a first switch selectively connecting said receive mixer circuit to inputs to said two filters and a second switch for selectively connecting said intermediate frequency amplifier to outputs from said two filters.

5. A method for conducting time division multiplex receiving, wherein a received frame includes plural consecutive receive slots, comprising the steps of:

providing two intermediate-frequency filters with a same performance; and alternately switching into operation said two intermediate-frequency filters during receipt of a frame between each adjacent pair of the consecutive receive slots in the frame;

wherein a propagation response delay in the output of either of said two intermediate-frequency filters for one of the consecutive receive slots is cancelled by switching into the other of said two intermediate-frequency filters for the immediately following one of the consecutive receive slots.

6. The method of claim 5, where there are four of the consecutive receive slots, and further comprising the steps of switching into operation a first one of the two filters during first and third of the four consecutive receive slots and switching a second one of the two filters into operation during second and fourth of the four consecutive receive slots.

7. The method of claim 5, further comprising the steps of using a first switch to selectively connect a receive mixer circuit to inputs to the two filters and using a second switch to selectively connect an intermediate frequency amplifier to outputs from the two filters.

* * * * *